United States Patent
Seo et al.

(10) Patent No.: US 12,511,805 B2
(45) Date of Patent: Dec. 30, 2025

(54) METHOD FOR REARRANGING WEBCOMIC CONTENT AND DEVICE THEREFOR

(71) Applicants: NAVER WEBTOON LTD., Seongnam-si (KR); RESEARCH & BUSINESS FOUNDATION SUNGKYUNKWAN UNIVERSITY, Suwon-si (KR)

(72) Inventors: Choong Hyun Seo, Seongnam-si (KR); Jae Hyuk Chang, Seongnam-si (KR); Sung Kil Lee, Suwon-si (KR); Moon Soo Jeong, Suwon-si (KR); Soon Hyeon Kwon, Suwon-si (KR)

(73) Assignees: NAVER WEBTOON LTD., Seongnam-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 211 days.

(21) Appl. No.: 18/331,622

(22) Filed: Jun. 8, 2023

(65) Prior Publication Data

US 2023/0351657 A1 Nov. 2, 2023

Related U.S. Application Data

(63) Continuation of application No. PCT/KR2021/018376, filed on Dec. 6, 2021.

(30) Foreign Application Priority Data

Dec. 8, 2020 (KR) ........................ 10-2020-0170747

(51) Int. Cl.
*G06T 11/60* (2006.01)
*G06T 3/40* (2024.01)
*G06Q 50/10* (2012.01)

(52) U.S. Cl.
CPC ................ *G06T 11/60* (2013.01); *G06T 3/40* (2013.01); *G06Q 50/10* (2013.01)

(58) Field of Classification Search
CPC . G06T 11/60; G06T 3/40; G06T 13/80; G06F 16/9577
See application file for complete search history.

(56) References Cited

U.S. PATENT DOCUMENTS 8,429,523 B2   4/2013   Tobita
8,819,545 B2   8/2014   Nonaka
(Continued)

FOREIGN PATENT DOCUMENTS

JP   2005038164 A   2/2005
JP   2011118833 A   6/2011
(Continued)

OTHER PUBLICATIONS

Ryu DS, Park SH, Lee JW, Lee DH, Cho HG. Cinetoon: A semi-automated system for rendering black/white comic books from video streams. In 2008 IEEE 8th International Conference on Computer and Information Technology Workshops Jul. 8, 2008 (pp. 336-341). IEEE. (Year: 2008).*

(Continued)

*Primary Examiner* — King Y Poon
*Assistant Examiner* — Vincent Peren
(74) *Attorney, Agent, or Firm* — Greer Burns & Crain Ltd.

(57) ABSTRACT

A method for rearranging webtoon content includes obtaining first content including a plurality of image cuts including a plurality of elements, extracting the plurality of elements included in the first content, generating a plurality of image cut layers by reconstructing the extracted plurality of ele- (Continued)

ments, and generating second content by arranging the generated plurality of image cut layers in a designated arrangement.

17 Claims, 13 Drawing Sheets

(56) References Cited

U.S. PATENT DOCUMENTS

| | | | | |
|---|---|---|---|---|
| 2009/0041352 | A1* | 2/2009 | Okamoto | G06T 11/60 382/176 |
| 2013/0086458 | A1* | 4/2013 | Kurata | G06T 11/60 715/202 |
| 2015/0067482 | A1 | 3/2015 | Georgiev | |
| 2019/0332906 | A1* | 10/2019 | Mori | G06K 15/1851 |
| 2022/0101580 | A1* | 3/2022 | Takahashi | H04N 1/387 |

FOREIGN PATENT DOCUMENTS

| | | |
|---|---|---|
| JP | 2013089196 A | 5/2013 |
| KR | 1020140031438 A | 3/2014 |

OTHER PUBLICATIONS

Arai K, Tolle H. Automatic e-comic content adaptation. International Journal of Ubiquitous Computing. Nov. 2010; 1(1):1-11. (Year: 2010).*

Cao Y, Chan AB, Lau RW. Automatic stylistic manga layout. ACM Transactions on Graphics (TOG). Nov. 1, 2012; 31(6):1-10. (Year: 2012).*

Tolle H, Arai K. Manga content extraction method for automatic mobile comic content creation. In 2013 International Conference on Advanced Computer Science and Information Systems (ICACSIS) Sep. 28, 2013 (pp. 321-328). IEEE. (Year: 2013).*

Jing G, Hu Y, Guo Y, Yu Y, Wang W. Content-aware video2comics with manga-style layout. IEEE Transactions on Multimedia. Aug. 27, 2015; 17(12): pp. 2122-2133. (Year: 2015).*

Wang Y, Zhou Y, Liu D, Tang Z. Comic storyboard extraction via edge segment analysis. Multimedia Tools and Applications. Mar. 2016; 75: pp. 2637-2654. (Year: 2016).*

Office action issued in corresponding Korean patent application No. 20-170747, dated Mar. 16, 2022.

Notice of allowance issued in corresponding Korean patent application No. 20-170747, dated Jan. 27, 2023.

Office action issued in corresponding Korean patent application No. 20-170747, dated Sep. 27, 2022.

ISR issued in Int'l. application No. PCT/KR2021/018376, mailed Mar. 15, 2022.

English translation of Office action issued in corresponding Korean patent application No. 20-170747, dated Mar. 16, 2022.

English translation of Notice of allowance issued in corresponding Korean patent application No. 20-170747, dated Jan. 27, 2023.

English translation of Office action issued in corresponding Korean patent application No. 20-170747, dated Sep. 27, 2022.

* cited by examiner

METHOD FOR REARRANGING WEBCOMIC CONTENT AND DEVICE THEREFOR

CROSS-REFERENCE TO RELATED APPLICATIONS

This is a continuation application of International Application No. PCT/KR2021/018376, filed Dec. 6, 2021, which claims the benefit of Korean Patent Application No. 10-2020-0170747, filed Dec. 8, 2020.

BACKGROUND OF THE INVENTION

Field of Invention

The disclosure relates to a method and apparatus for rearranging image cuts of webtoon content. More particularly, the disclosure relates to a method and apparatus for changing an arrangement of image cuts from webtoon content to published comics format content.

Description of Related Art

In published comics, a plurality of image cuts are arranged on pages with fixed ratios, but in webtoons, a ratio of a page is not limited and thus a length of the page may be long. In this regard, a plurality of image cuts are two-dimensionally arranged on one page for published comics, whereas a plurality of image cuts are arranged vertically for webtoons.

Recently, as the form of using comics has shifted from published comics to webtoons, there is a trend in which popular webtoons are being distributed in the format of published comics. Artists generate webtoon content files by using graphic editors such as Photoshop. Accordingly, there is a need to provide technology for changing webtoon content into content in the format of published comics.

BRIEF SUMMARY OF THE INVENTION

Embodiments of the disclosure provide a method and apparatus for reducing time and efforts invested to change a webtoon into the format of published comics.

Embodiments of the disclosure provide a method and apparatus for providing a graphic user interface for changing a webtoon into the format of published comics.

A method of rearranging webtoon content, according to an embodiment of the disclosure, includes obtaining first content including a plurality of image cuts including a plurality of elements, extracting the plurality of elements included in the first content, generating a plurality of image cut layers by reconstructing the extracted plurality of elements, and generating second content by arranging the generated plurality of image cut layers in a designated arrangement.

According to an embodiment, the first content may include the plurality of image cuts arranged in a line, and the second content may be generated by two-dimensionally arranging the plurality of image cut layers in the designated arrangement.

According to an embodiment, the extracting of the plurality of elements may include extracting a first element including a drawing element included in the first content, and a second element that is not the drawing element, and the generating of the plurality of image cut layers may include generating the plurality of image cut layers by reconstructing the second element, based on a distance to the first element.

According to an embodiment, the plurality of elements may include a plurality of background elements, a plurality of drawing elements, a plurality of speech bubble elements, and a plurality of text elements, and the generating of the plurality of image cut layers may further include generating the plurality of image cut layers respectively corresponding to the plurality of drawing elements, wherein the plurality of background elements, the plurality of speech bubble elements, and the plurality of text elements may be included in at least one of the plurality of image cut layers, based on positions of the plurality of drawing elements arranged in the first content.

According to an embodiment, the generating of the second content may include determining an order of the plurality of image cut layers, based on y-axis positions of the plurality of image cuts arranged in the first content, and generating the second content by arranging the plurality of image cut layers in the designated arrangement according to the determined order.

According to an embodiment, the plurality of elements may include a first element including a drawing element and a second element that is not the drawing element, and the generating of the second content may include determining an order of the plurality of image cut layers, based on a position of the first element arranged in the first content, and generating the second content by arranging the plurality of image cut layers in the designated arrangement according to the determined order.

According to an embodiment, the extracting of the plurality of elements may include extracting a layer mask element, and the generating of the second content may include matching the extracted layer mask element to the plurality of image cut layers.

According to an embodiment, the method may further include changing an order of the plurality of image cut layers in response to receiving a user input for at least one image cut layer from among the plurality of image cut layers arranged in the designated arrangement.

According to an embodiment, the generating of the second content may include changing a size of a specific image cut layer, in response to receiving a user input for changing the size of the specific image cut layer.

According to an embodiment, the extracting of the plurality of elements may include extracting a first element including a drawing element and a second element including a text element, the plurality of image cut layers may include at least one first element and at least one second element, and the changing of the size of the specific image cut layer may include changing a size of the first element by a first numerical value and changing a size of the second element by a second numerical value.

According to an embodiment, the first numerical value may be greater than the second numerical value.

According to an embodiment, the second numerical value may be less than a threshold value.

An apparatus for rearranging webtoon content, according to another embodiment of the disclosure, includes a processor configured to obtain first content including a plurality of image cuts including a plurality of elements, extract a plurality of elements included in the first content, generate a plurality of image cut layers by reconstructing the extracted plurality of elements, and generate second content by arranging the generated plurality of image cut layers in a designated arrangement.

According to an embodiment, the processor may be further configured to extract a first element including a drawing element included in the first content, and a second element that is not the drawing element, and generate the plurality of image cut layers by reconstructing the second element, based on a distance to the first element.

According to an embodiment, the processor may be further configured to determine an order of the plurality of image cut layers, based on y-axis positions of the plurality of image cuts arranged in the first content, and generate the second content by arranging the plurality of image cut layers in the designated arrangement according to the determined order.

According to an embodiment, the plurality of elements may include a first element including a drawing element and a second element that is not the drawing element, and the processor may be further configured to determine an order of the plurality of image cut layers, based on a position of the first element arranged in the first content, and generate the second content by arranging the plurality of image cut layers in the designated arrangement according to the determined order.

According to an embodiment, the processor may be further configured to extract a layer mask element and match the extracted layer mask element with the plurality of image cut layers.

According to an embodiment, the processor may be further configured to change an order of the plurality of image cut layers in response to receiving a user input for at least one image cut layer from among the plurality of image cut layers arranged in the designated arrangement.

According to an embodiment, the processor may be further configured to change a size of a specific image cut layer, in response to receiving a user input for changing the size of the specific image cut layer.

Other aspects, features, and advantages may become clear from the following drawings, the claims, and the detailed description of the disclosure.

According to embodiments of the disclosure, time and effort invested to change a webtoon into the format of published comics may be reduced.

DETAILED DESCRIPTION OF THE INVENTION

Figure 1:
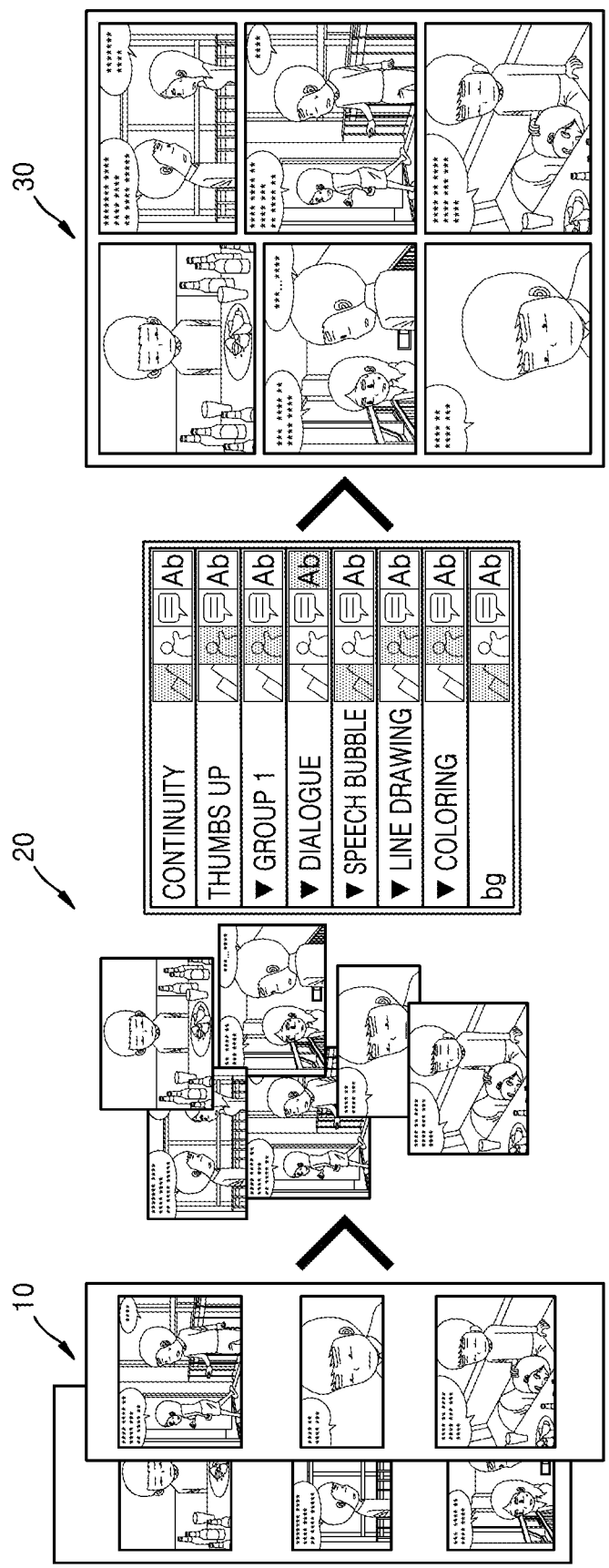
FIG. 1 illustrates an example of a method of rearranging webtoon content, according to an embodiment of the disclosure.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein should be defined based on the meaning of the terms together with the description throughout the specification.

Embodiments may have various modifications and various forms, and some embodiments are illustrated in the drawings and are described in detail. However, this is not intended to limit the embodiments to particular modes of practice, and it will be understood that all changes, equivalents, and substitutes that do not depart from the spirit and technical scope of the embodiments are encompassed in the disclosure. Also, the terms used in the present specification are only used to describe the embodiments, and are not intended to limit the embodiments.

Unless defined otherwise, the terms used in the embodiments have the same meanings as those generally understood by one of ordinary skill in the art. Terms that are defined in commonly used dictionaries should be interpreted as having meanings consistent with those in the context of the related art, and should not be interpreted in ideal or excessively formal meanings unless clearly defined in the embodiments.

The detailed description of the disclosure to be described below refers to the accompanying drawings, which illustrate specific embodiments in which the disclosure may be practiced. These embodiments are described in sufficient detail to enable one of ordinary skill in the art to practice the disclosure. It is to be understood that various embodiments of the disclosure are different from each other, but need not be mutually exclusive. For example, specific shapes, structures, and characteristics described herein may be changed from one embodiment to another embodiment and implemented without departing from the spirit and scope of the disclosure. In addition, it should be understood that positions or arrangements of individual elements in each embodiment may be changed without departing from the spirit and scope of the disclosure. Accordingly, the detailed description described below is not implemented in a limiting sense, and the scope of the disclosure may encompass the scope claimed by claims and all scopes equivalent thereto. In drawings, the like reference numerals denote the same or similar elements over various aspects.

Hereinafter, various embodiments of the disclosure will be described in detail with reference to accompanying drawings to enable one of ordinary skill in the art to easily execute the disclosure.

Hereinafter, a method of rearranging webtoon content, according to an embodiment of the disclosure, will be described in detail with reference to FIG. 1.

According to an embodiment, an apparatus for rearranging webtoon content may generate second content 30 in the format of published comics by reconstructing first content 10 in a webtoon format.

In the disclosure, first content may denote an image file in a webtoon format according to context. An image file in a webtoon format may be a general image file, a computer-aided design (CAD) file, or a Photoshop file (periscope debugger definition (PSD)). In the first content in a webtoon format, a plurality of image cuts are generally arranged in a line (e.g., vertically or horizontally) to be easily used by a user online.

In the disclosure, second content may denote an image file generated in the format of comics published in a book, according to context. In the second content, a plurality of image cuts are generally arranged two-dimensionally on one page. For example, the plurality of image cuts may be arranged in a plurality of lines or rows, and one or more image cuts may be arranged horizontally for each line. In published comics, one image cut or a portion of one image cut may occupy one page. In this case as well, the second content in the above-described arrangement may be generated according to the method of the disclosure.

As described above, a data format of the first content 10 is not limited. According to an embodiment, some or all of layers configuring the first content may be separated. In general, webtoon content includes a plurality of layers, and a separation standard and separation method of layers vary depending on a working style of an artist. For example, text included in a plurality of image cuts may be included in one layer, and a speech bubble and a background image may be included in another layer. Thus, the method of rearranging webtoon content, according to an embodiment of the disclosure, may generate a new layer by reconstructing and rearranging a plurality of elements regardless of an existing layer separation standard, so as to distinguish the first content 10 in units of cuts. In other words, a category of elements included in each layer of content is not consistent for each artist and each webtoon, and thus the method of rearranging webtoon content, according to some embodiments of the disclosure described below, may generate a cut layer 20 corresponding to a cut unit by reconstructing a plurality of elements according to a certain standard. Also, according to an embodiment, the apparatus for rearranging webtoon content may generate the second content 30 arranged in various forms by rearranging a plurality of cut layers 20. At this time, a method of arranging the plurality of cut layers 20 to generate the second content 30 is not limited. For example, the second content 30 in the format of published comics, in which the cut layers 20 are arranged in 5 lines and 2 columns, may be generated. This will be described in detail below with reference to a related drawing.

Figure 2:
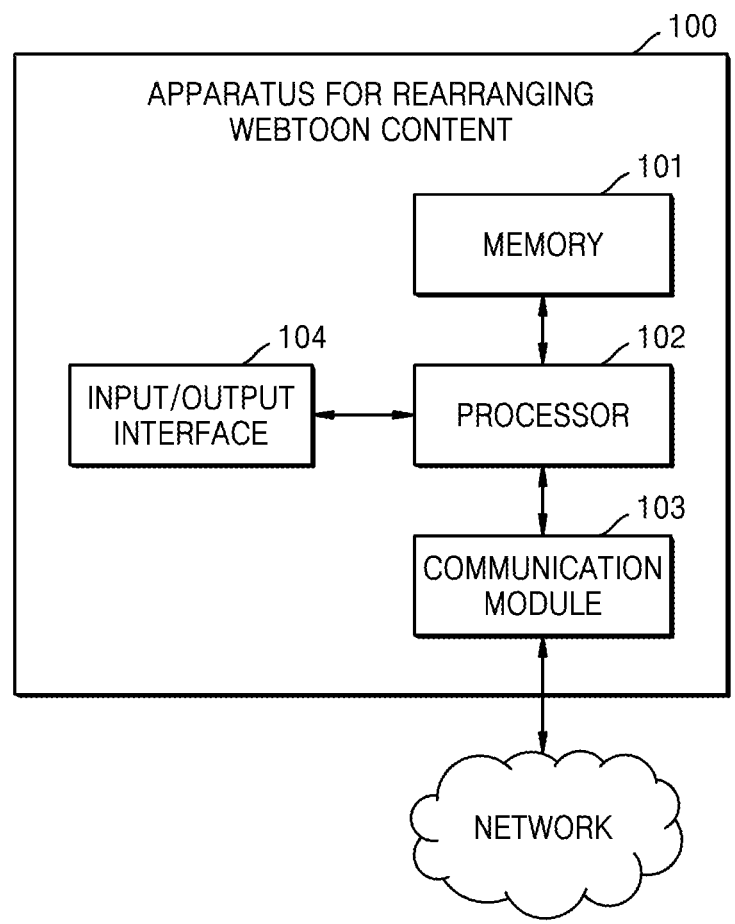
FIG. 2 is a block diagram of an internal configuration of an apparatus for rearranging webtoon content, according to an embodiment of the disclosure.

FIG. 2 is a block diagram of internal configurations of an apparatus for rearranging webtoon content, according to an embodiment of the disclosure.

According to an embodiment, an apparatus 100 for rearranging webtoon content may include a memory 101, a processor 102, a communication module 103, and an input/output interface 104.

The memory 101 is a computer-readable recording medium, and may include random access memory (RAM), read-only memory (ROM), and a permanent mass storage device such as a disk drive. Also, the memory 101 may temporarily or permanently store content data, and program code and configuration for controlling the apparatus 100.

The processor 102 may be configured to process an instruction of a computer program by performing basic arithmetic, logic, and input/output operations. The instruction may be provided to the processor 102 by the memory 101 or the communication module 103. For example, the processor 102 may be configured to execute a received instruction according to program code stored in a recording device, such as the memory 101. According to an embodiment, the processor 102 may obtain first content including a plurality of image cuts including a plurality of elements, extract the plurality of elements included in the first content, generate a plurality of image cut layers by reconstructing the extracted plurality of elements, and generate second content by arranging the generated plurality of image cut layers in a designated arrangement.

The communication module 103 may provide a function for communicating with an external server through a network. For example, a request generated by the processor 102 of the apparatus 100 according to program code stored in a recording medium, such as the memory 101, may be transmitted to the external server through the network, according to a control by the communication module 103. On the other way around, a control signal, an instruction, content, a file, or the like provided according to a control by a processor of the external server may be received by the apparatus 100 through the communication module 103 via the network. For example, the control signal or instruction of the external server received through the communication module 103 may be transmitted to the processor 102 or memory 101, and the content or file may be stored in a storage medium that may be further included in the apparatus 100.

Also, the communication module 103 may communicate with the external server through the network. A communication method is not limited, but the network may be a short-range wireless communication network. For example, the network may be a Bluetooth, Bluetooth low energy (BLE), or Wi-Fi communication network.

The input/output interface 104 may be a unit for an interface with an input/output device. For example, an input device may include a device such as a keyboard or a mouse, and an output device may include a device such as a display for displaying a communication session of an application. As another example, the input/output interface 104 may be a unit for an interface with a device in which functions for input and output are integrated, such as a touch screen. In detail, while the processor 102 of the apparatus 100 processes an instruction of a computer program loaded onto the memory 101, a service screen or content configured by using data provided by the external server may be displayed on a display through the input/output interface 104.

Also, according to other embodiments, the apparatus 100 may include more components than those shown in FIG. 2. For example, the apparatus 100 may include a battery or charging device for supplying power to internal components of the apparatus 100, may be implemented to include at least a part of the input/output device described above, or may further include other component, such as a transceiver, various sensors, and a database.

Figure 3:
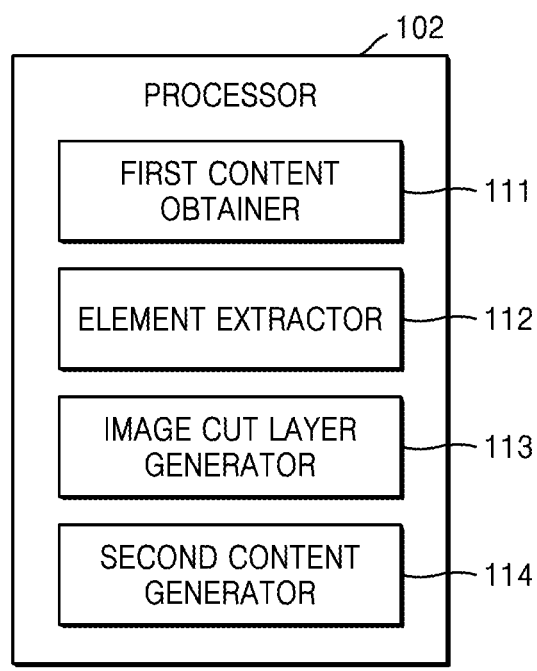
FIG. 3 illustrates a block diagram of a processor, according to an embodiment of the disclosure.

Hereinafter, an internal configuration of a processor of an apparatus for rearranging webtoon content, according to an embodiment of the disclosure, will be described in detail with reference to FIG. 3. For convenience of understanding, the processor is described as if the processor is the processor 102 of the apparatus 100 of FIG. 2, but it should be noted that, when rearrangement of webtoon content is performed by the external server, according to an embodiment, the processor may be the processor of the external server.

The processor 102 of the apparatus 100, according to an embodiment of the disclosure, may include a first content obtainer 111, an element extractor 112, an image cut layer generator 113, and a second content generator 114. According to some embodiments, the components of the processor 102 may be selectively included in or excluded from the processor 102. Also, according to some embodiments, the components of the processor 102 may be separated or combined for representation of functions of the processor 102.

Figure 4:
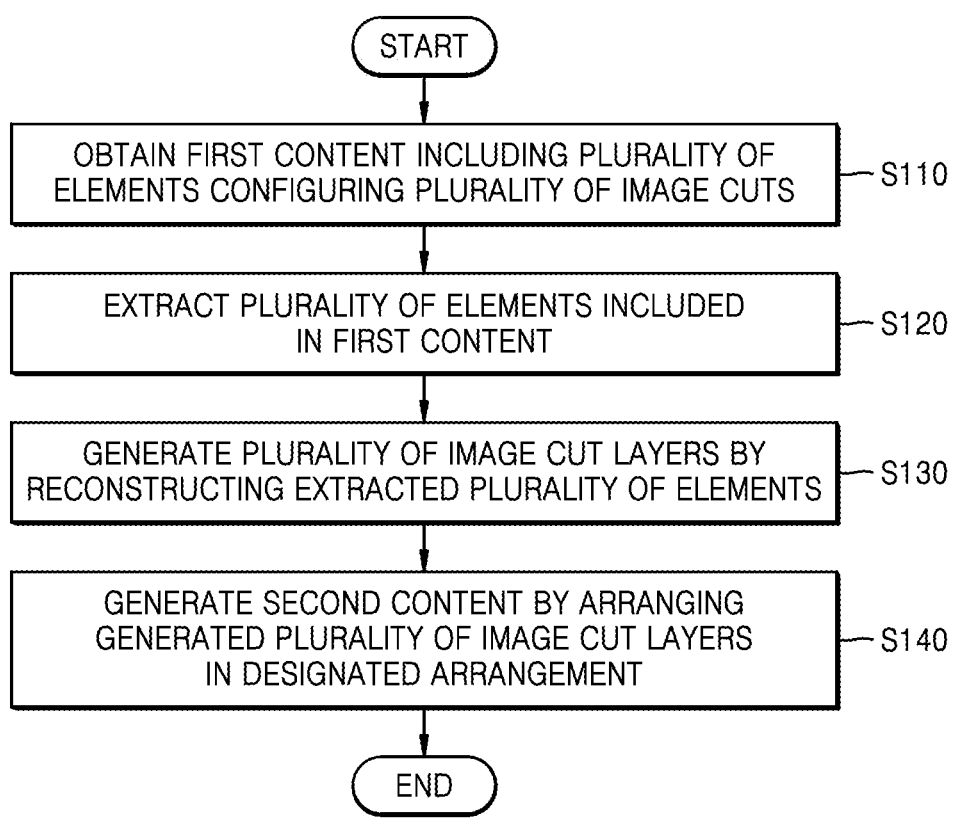
FIG. 4 is a flowchart of a method of rearranging webtoon content, according to an embodiment of the disclosure.

The processor 102 and the components of the processor 102 may control the apparatus 100 to perform operations S110 through S140 included in a method of rearranging webtoon content of FIG. 4. For example, the processor 102 and the components of the processor 102 may be implemented to execute instructions according to code of an operating system or code of at least one program included in the memory 101. Here, the components of the processor 102 may be representations of different functions of the processor 102, which are performed by the processor 102 according to instructions provided by the program code stored in the apparatus 100. An internal configuration and detailed operations of the processor 102 will be described with reference to the method of FIG. 4 and embodiments of FIGS. 5 through 13.

FIG. 4 is a flowchart of the method of rearranging webtoon content, according to an embodiment of the disclosure.

In operation S110, the apparatus 100 for rearranging webtoon content may obtain the first content including the plurality of elements making up the plurality of image cuts. As described above, the first content may denote an image file in a webtoon format according to context. An image file in a webtoon format may be a general image file, a computer-aided design (CAD) file, or a Photoshop file (periscope debugger definition (PSD)). In detail, the first content may include the plurality of image cuts, and the plurality of image cuts may include a plurality of layers. Each layer may include at least one element. According to an embodiment, each of the plurality of layers included in the first content may include at least one element from among a background element, a drawing element, a speech bubble element, an overlay effect element, and a text element. For example, a specific layer may only include a drawing element and another layer may include only a text element. However, this is only an example and a method of configuring a layer varies according to artists, and thus another layer may include a background element and a speech bubble element.

In operation S120, the apparatus 100 may extract the plurality of elements included in the first content. Types and number of elements included in the first content are not limited.

According to an embodiment, the apparatus 100 may extract a first element including a drawing element and a second element not including the drawing element from the first content. Alternatively, according to an embodiment, the first content may include at least one element from among a background element, a drawing element, a speech bubble element, an overlay effect element, and a text element. This will be described in detail below with reference to FIG. 5 below.

In operation S130, the apparatus 100 may generate the plurality of image cut layers by reconstructing the extracted plurality of elements. In detail, the apparatus 100 according to some embodiments of the disclosure may generate the plurality of image cut layers corresponding to respective image cuts by reconstructing the plurality of elements. Meanwhile, the apparatus 100 according to an embodiment may reconstruct different elements, based on a drawing element. For example, when the apparatus 100 has extracted the first element including the drawing element included in the first content, and the second element that is not the drawing element, the apparatus 100 may generate the plurality of image cut layers by reconstructing the second element, based on a distance between the second element and the first element, i.e., the physical distance between the location of the second element relative to the first element as they appear in the corresponding image cut in the first content.

According to an embodiment, the image cut layer includes at least one drawing element, and thus, the plurality of image cut layers may respectively correspond to the plurality of image cuts included in the first content. In other words, according to an embodiment, when the apparatus 100 has extracted, from the first content, a plurality of background elements, a plurality of drawing elements, a plurality of speech bubble elements, and a plurality of text elements, the apparatus 100 may generate the plurality of image cut layers respectively corresponding to the plurality of drawing elements, wherein the plurality of background elements, the plurality of speech bubble elements, and the plurality of text elements may be included in at least one of the plurality of image cut layers, based on positions of the plurality of drawing elements arranged in the first content.

In operation S140, the apparatus 100 may generate the second content by arranging the generated plurality of image cut layers in a designated arrangement.

In detail, the apparatus 100 may determine an order of the plurality of image cut layers, based on y-axis (vertical) positions of the plurality of image cuts arranged in the first content. Also, the apparatus 100 may generate the second content by arranging the plurality of image cut layers in the designated arrangement, according to the determined order.

According to some embodiments described above, when the apparatus 100 has extracted the first element including the drawing element and the second element that is not the drawing element from the first content, and the apparatus 100 may determine the order of the plurality of image cut layers, based on a position of the first element arranged in the first content, and generate the second content by arranging the plurality of image cut layers in the designated arrangement according to the determined order.

According to another embodiment, the apparatus 100 may further extract a layer mask element from the first content. When a layer mask is applied to a layer of original webtoon content, the layer mask applied to the original webtoon content may be deleted while separating and reconstructing elements. Accordingly, the apparatus 100 may match the extracted layer mask element to the plurality of image cut layers, and restore the layer mask described above in the second content generated afterwards. In detail, after receiving the first content, the apparatus 100 may determine existence of a layer mask for each element during preprocessing, and separately map and store layer mask data for each element.

According to another embodiment, the apparatus 100 may provide a user interface and receive a user input for rearranging the webtoon content. According to an embodiment, the apparatus 100 may change the order of the plurality of image cut layers in response to receiving a user input for at least one image cut layer from among the plurality of image cut layers arranged in the designated arrangement. Also, according to an embodiment, the apparatus 100 may change the size of a specific image cut layer, in response to receiving a user input for changing the size of the specific image cut layer. This will be described in detail below with reference to a related drawing.

Figure 5:
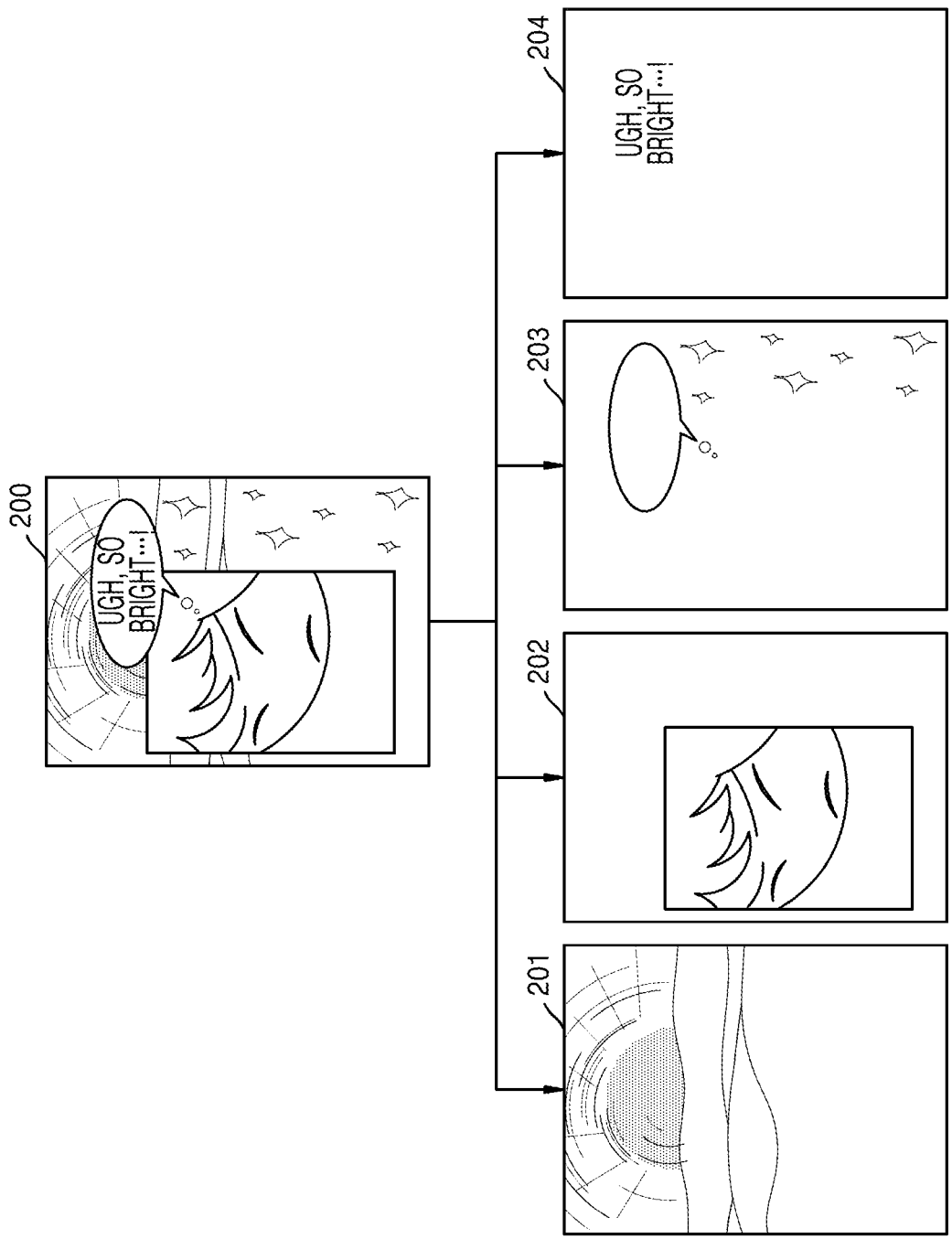
FIG. 5 is a diagram for describing elements making up an image cut, according to an embodiment of the disclosure.

FIG. 5 is a diagram for describing elements making up an image cut, according to an embodiment of the disclosure.

The apparatus 100 may extract the plurality of elements included in the first content. According to an embodiment, the apparatus 100 may extract the first element including a drawing element and the second element not including the drawing element, from the first content. Alternatively, according to an embodiment, the first content may include at least one element from among a background element 201, a drawing element 202, speech bubble/overlay effect elements 203, and a text element 204.

The background element 201 is included in a layer located below a layer including the drawing element 202. The drawing element 202 is included in a layer including an image cut or a drawing inside the image cut. The speech bubble/overlay effect elements 203 are included in a layer located on the layer including the drawing element 202. The text element 204 is included in a layer located on the layer including the speech bubble/overlay effect elements 203.

At least one of a plurality of image cuts included in the first content may include one or more speech bubbles. In FIG. 5, an image cut 200 including a speech bubble is illustrated. Alternatively, according to an embodiment, speech bubbles may include text located therein.

At least one of image cuts may include sound effects and/or overlay effects, which are represented while overlapping a cartoon drawing. The sound effect is a cartoon technique that represents background sound or field sound in text. Examples of the sound effect may include "pitter-patter" for vividly representing a raining state, "bang" for emphasizing and vividly representing a blow or explosion, and "wham" for emphasizing and vividly representing a collision. Examples of the overlay effects may be indications such as glitter, brightening, water drops, or glare, which are expressed by an artist.

At least one of the image cuts may include text. In general cartoons, dialogues or thoughts of characters are represented in speech bubbles including text, and descriptions of background or situations are represented in text without a speech bubble. Thoughts of characters may alternately be represented in text without a speech bubble. Obviously, there may be text without a speech bubble.

Figure 6:
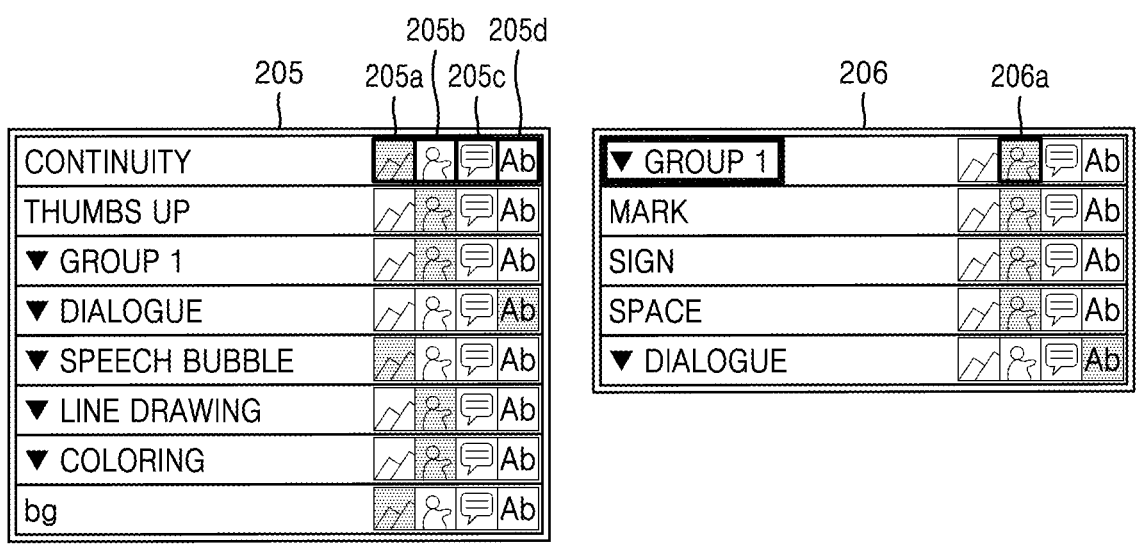
FIG. 6 illustrates an example of a graphic user interface (GUI) for setting elements making up an image cut, according to an embodiment of the disclosure.

FIG. 6 illustrates an example of a graphic user interface (GUI) for setting elements making up an image cut, according to an embodiment of the disclosure.

According to an embodiment, the apparatus 100 may extract the plurality of elements from the first content and distinguish the types of elements. Also, the apparatus 100 may receive a user feedback input for the extracted plurality of elements, and change the type of each element according to the user feedback input.

FIG. 6 illustrates a structure 205 of a layer included in the first content. Referring to FIG. 6, the first content includes the plurality of layers, such as "continuity", "thumbs up", "group 1", "dialogue", and "speech bubble", and each layer includes at least one element. For example, the type of each element may be distinguished as at least one of a background element 205a, a drawing element 205b, speech bubble/overlay effect elements 205c, and a text element 205d.

According to some embodiments, a specific layer may include a plurality of elements, and in this case, types of the plurality of elements included in the layer are not limited.

For example, a "continuity" layer may include a background element and a drawing element.

However, an artist may include the same type of elements to a specific layer, according to his/her style, and thus when a user input of designating the type of element for a layer is received, the types of a plurality of elements included in the layer may be changed to the same type. For example, when types of elements "mark", "sign", and "space" included in a group 1 layer 206 are to be set as a drawing, a user may select a user interface (UI) object 206a for designating the types of elements for the group 1 layer 206 to drawing.

Figure 7:
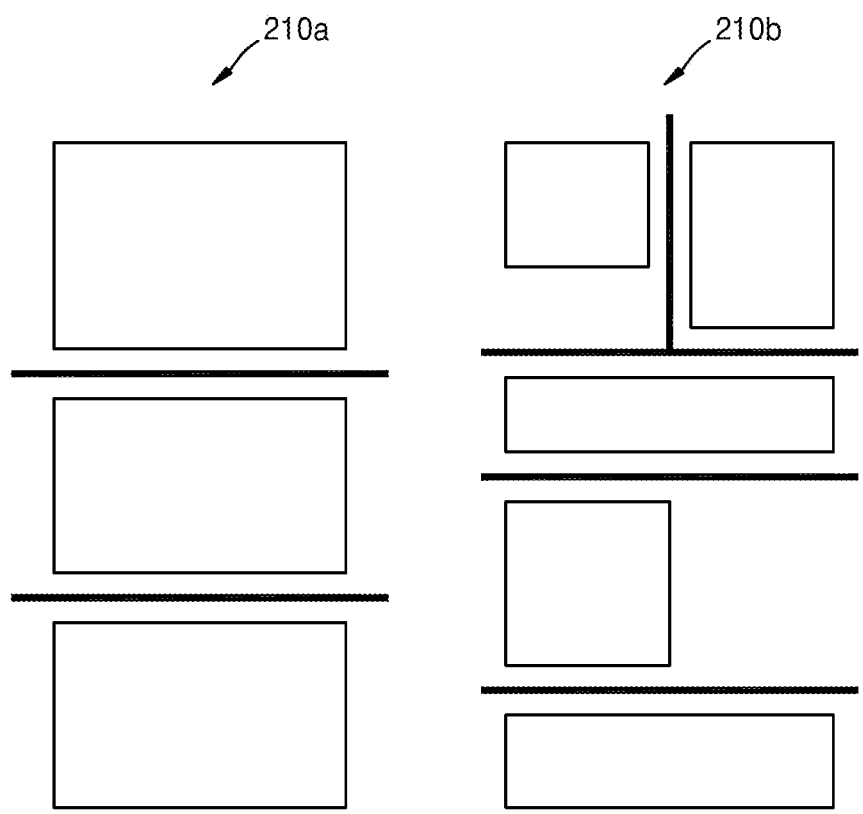
FIGS. 7 and 8 are diagrams for describing a method of determining an order of a plurality of image cuts, according to an embodiment of the disclosure.
Figure 8:
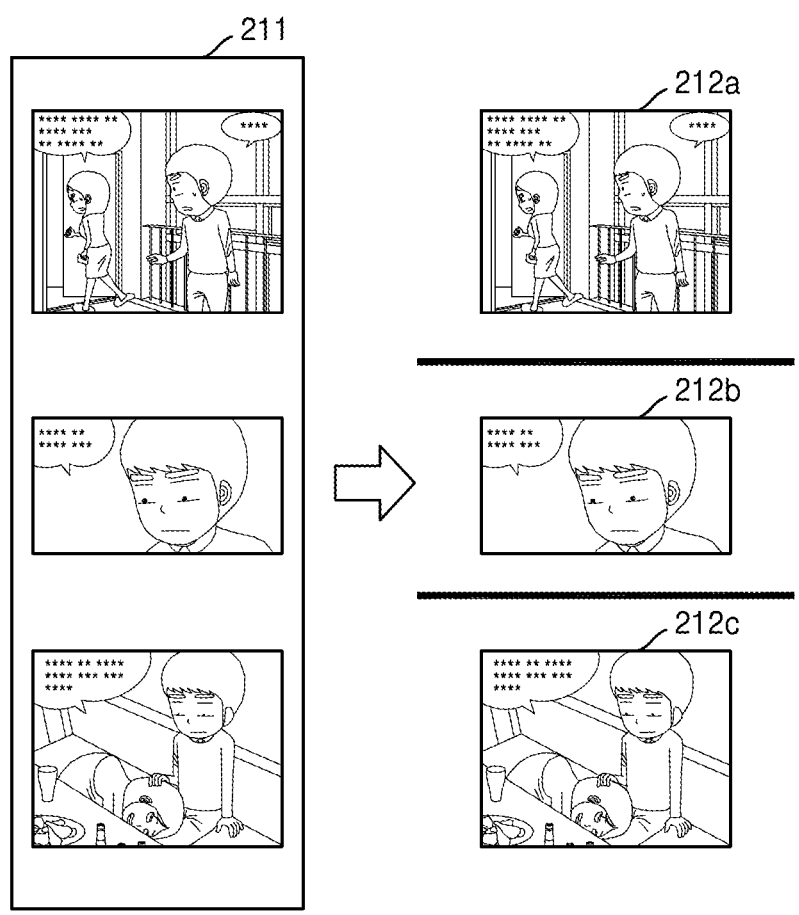

FIGS. 7 and 8 are diagrams for describing a method of determining an order of a plurality of image cuts, according to an embodiment of the disclosure.

The apparatus 100 may generate the plurality of image cut layers by reconstructing the extracted plurality of elements. In detail, the apparatus 100 according to some embodiments of the disclosure may generate the plurality of image cut layers corresponding to respective image cuts by reconstructing the plurality of elements.

In this regard, the apparatus 100 according to some embodiments of the disclosure may analyze positions of the image cuts included in the first content and reconstruct the plurality of elements, based on the order and analyzed positions of the image cuts.

Hereinafter, a method of analyzing the positions and order of the plurality of image cuts according to an image cut configuration of the first content will be described with reference to FIG. 7.

Referring to FIG. 7, in a case 210a where the first content includes the plurality of image cuts arranged in a vertical line, the apparatus 100 may use positions of y-axes in which the image cuts are arranged to measure a distance to an adjacent image cut, thereby analyzing the positions and order of the image cuts.

According to another embodiment, in a case 210b where the first content includes the plurality of image cuts arranged randomly in 2 dimensions, the apparatus 100 uses the positions of the y-axes of the image cuts as described above, while additionally obtaining information about whether the first content is in a left-binding manner or a right-binding manner, thereby analyzing the positions and order of the image cuts in further consideration of positions in x-axes.

Meanwhile, the apparatus 100 according to some embodiments of the disclosure may reconstruct different elements, based on a drawing element.

Referring to FIG. 8, a plurality of image cuts included in first content 211, according to an embodiment, may each include at least one drawing element. Accordingly, in the present embodiment, the apparatus 100 may analyze positions and order of the plurality of image cuts, based on a position of the drawing element. In other words, the apparatus 100 may extract drawing elements included in the first content 211 and generate a temporary layer including the drawing elements. Also, the apparatus 100 may analyze the positions and order of the image cuts, by using the generated temporary layer.

In other words, referring to FIG. 8, when the first content 211 includes the plurality of image cuts arranged in a line, the apparatus 100 may analyze the positions and the order of the drawing elements 212a, 212b, and 212c by using positions on the y-axes on which the drawing elements 212a, 212b, and 212c are arranged.

According to the present embodiment, the apparatus 100 searches the temporary layer including the drawing elements sequentially for the drawing elements, based on a y-axis. Also, the apparatus 100 may calculate an average height and average interval of the image cuts, and when an interval between predicted image cuts is too small, merge the image cut into one. Through such analysis on the image cuts, the apparatus 100 may remove blank spaces included in the plurality of image cuts.

Figure 9:
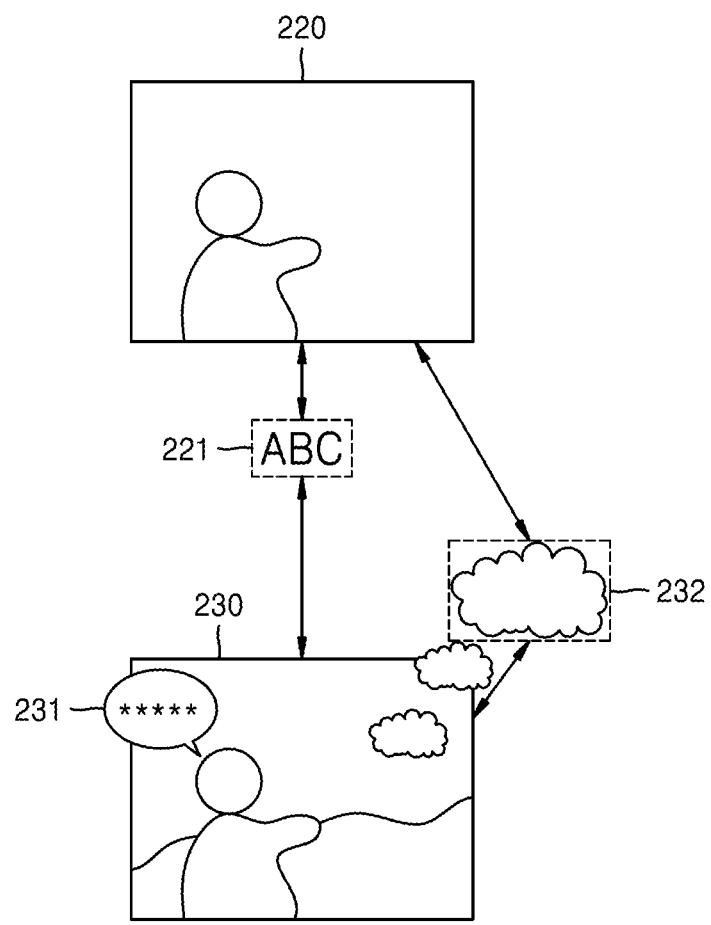
FIG. 9 is a diagram for describing a method of generating an image cut layer by reconstructing a plurality of elements, according to an embodiment of the disclosure.

FIG. 9 is a diagram for describing a method of generating an image cut layer by reconstructing a plurality of elements, according to an embodiment of the disclosure.

As described above, the apparatus 100 may reconstruct different elements, based on a drawing element. For example, when the apparatus 100 has extracted first elements 220 and 230 including the drawing element included in the first content, and second element 221, 231, and 232 that are not the drawing element, the apparatus 100 may generate a plurality of image cut layers by reconstructing a second element, based on a distance between the second element and a first element.

According to an embodiment, the image cut layer includes at least one drawing element, and thus the plurality of image cut layers may respectively correspond to the plurality of image cuts included in the first content. In other words, according to an embodiment, when the apparatus 100 has extracted, from the first content, a plurality of background elements, a plurality of drawing elements, a plurality of speech bubble elements, and a plurality of text elements, the apparatus 100 may generate the plurality of image cut layers respectively corresponding to the plurality of drawing elements, wherein the plurality of background elements, the plurality of speech bubble elements, and the plurality of text elements may be included in at least one of the plurality of image cut layers, based on positions of the plurality of drawing elements arranged in the first content.

FIG. 9 illustrates a case where the apparatus 100 has extracted a first drawing element 220, a second drawing element 230, the first speech bubble element 231, a second speech bubble element 232, and a sound effect element 221. For an element that is not a drawing element from among the plurality of elements extracted from the first content, the apparatus 100 measures distances to the drawing elements. The first speech bubble element 231 and the second speech bubble element 232 are closer to the second drawing element 230 than to the first drawing element 220, and the sound effect element 221 is closer to the first drawing element 220 than to the second drawing element 230. Accordingly, the first drawing element 220 and the sound effect element 221 may be included in a first image cut layer, and the second drawing element 230, the first speech bubble element 231, and the second speech bubble element 232 may be included in a second image cut layer.

Figure 10:
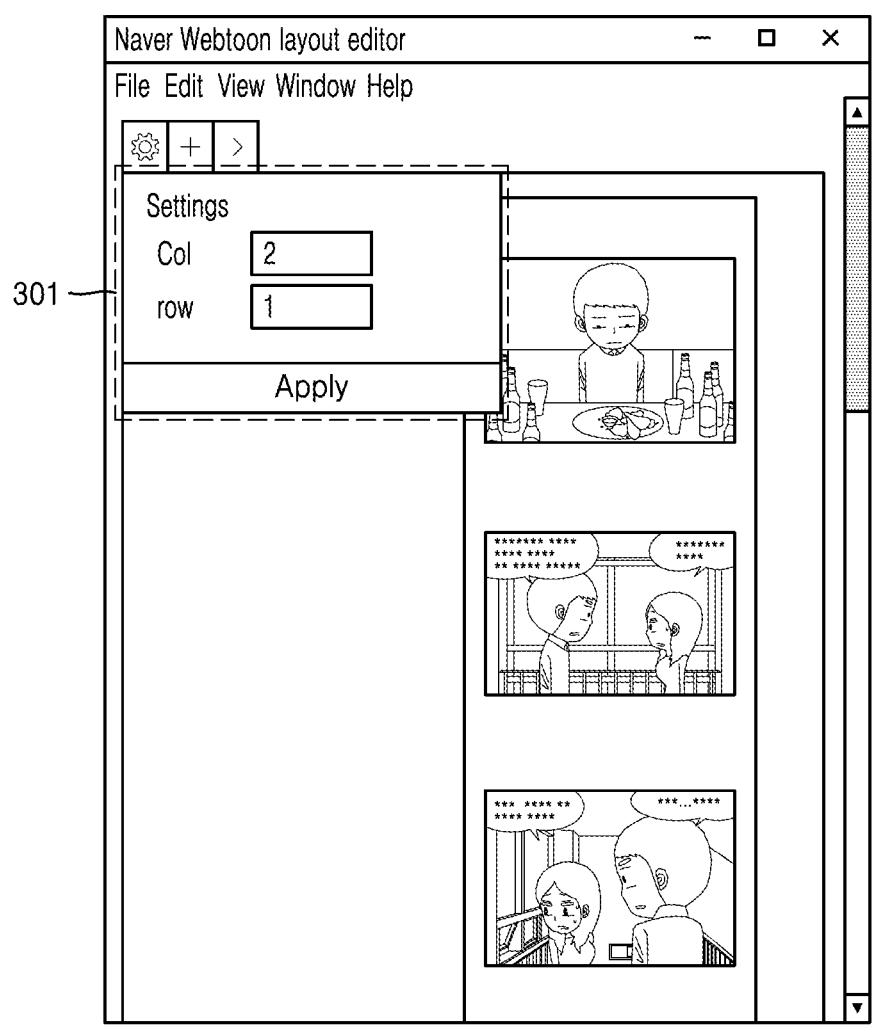
FIG. 10 illustrates an example of a GUI for setting an arrangement of second content, according to an embodiment of the disclosure.

FIG. 10 illustrates an example of a GUI for setting an arrangement of second content, according to an embodiment of the disclosure.

The apparatus 100 may generate the second content by arranging the generated plurality of image cut layers in the designated arrangement. According to an embodiment, the apparatus 100 may receive a user input 301 for arrangement information related to the second content through an input/output interface. FIG. 10 illustrates a case where a user input for obtaining the second content, in which the first content is rearranged in one line and two columns, is received. The disclosure is not limited thereto, and the apparatus 100 may receive the arrangement information for arranging the second content, from the external server. Also, according to some embodiments, the apparatus 100 may generate the second content arranged in an optimum arrangement, in consideration of an average size and positions of the obtained plurality of image cut layers. For example, the apparatus 100 may generate the second content in which the plurality of image cut layers are arranged such that blank spaces are minimized.

According to some embodiments, the apparatus 100 may further extract the layer mask element from the first content. When a layer mask is applied to a layer of original webtoon content, the layer mask applied to the original webtoon content may be deleted while separating and reconstructing elements. Accordingly, the apparatus 100 according to the present embodiment may match the extracted layer mask element to the plurality of image cut layers, and restore the layer mask described above in the second content generated afterwards. In detail, after receiving the first content, the apparatus 100 may determine existence of a layer mask for each element during preprocessing, and separately map and store layer mask data for each element.

Figure 11:
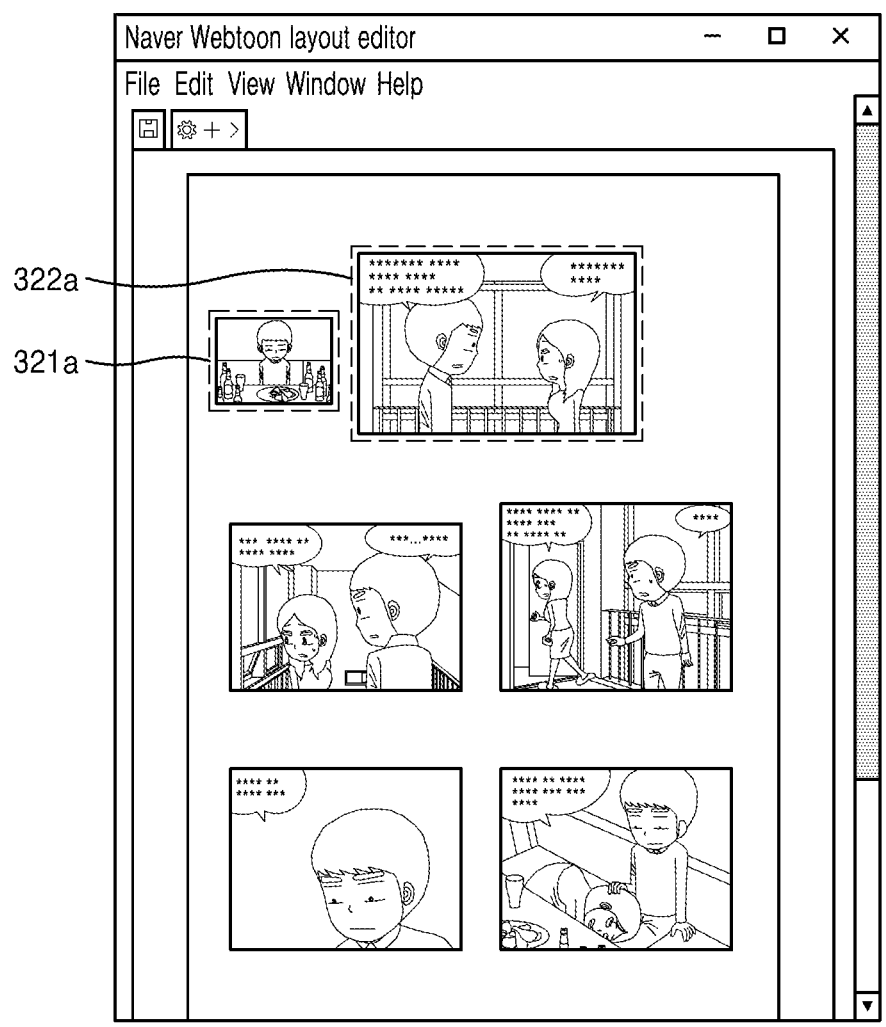
FIGS. 11 and 12 illustrate examples of a GUI for editing an image cut layer, according to an embodiment of the disclosure.
Figure 12:
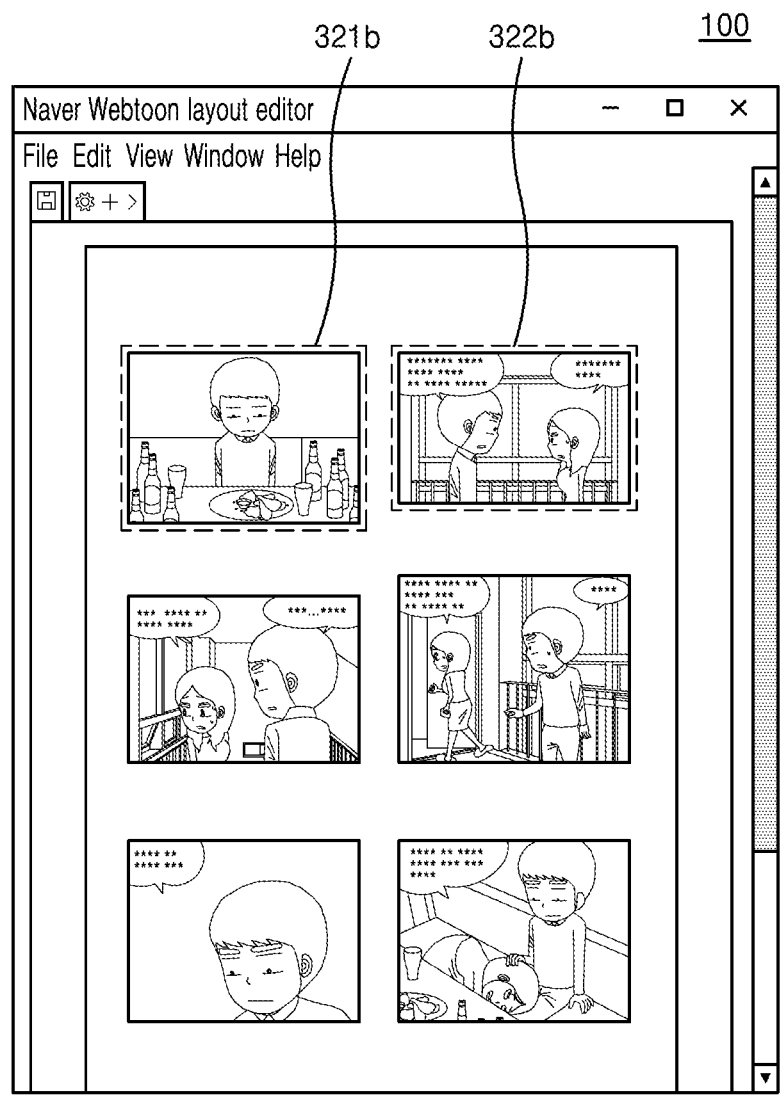

FIGS. 11 and 12 illustrate examples of a GUI for editing an image cut layer, according to an embodiment of the disclosure.

The apparatus 100 may provide a user interface and receive a user input for rearranging the webtoon content. The apparatus 100 according to an embodiment may analyze the positions and order of the image cuts included in the first content, and receive a user input for feeding back a result of the analysis. Alternatively, according to another embodiment, the apparatus 100 may generate the plurality of image cut layers configuring the second content, and receive a user input for arranging the plurality of image cut layers.

According to an embodiment, the apparatus 100 may change the order and positions of the plurality of image cut layers in response to receiving a user input for at least one image cut layer from among the plurality of image cut layers arranged in the designated arrangement. Also, according to an embodiment, the apparatus 100 may change the size of a specific image cut layer, in response to receiving a user input for changing the size of the specific image cut layer.

For example, when a user input for changing the size of a first image cut layer 321a and a user input for changing the position of a second image cut layer 322a are received as shown in FIG. 11, the size of a first image cut layer 321b may be enlarged and the position of a second image cut layer 322b may be changed as shown in FIG. 12.

Figure 13:
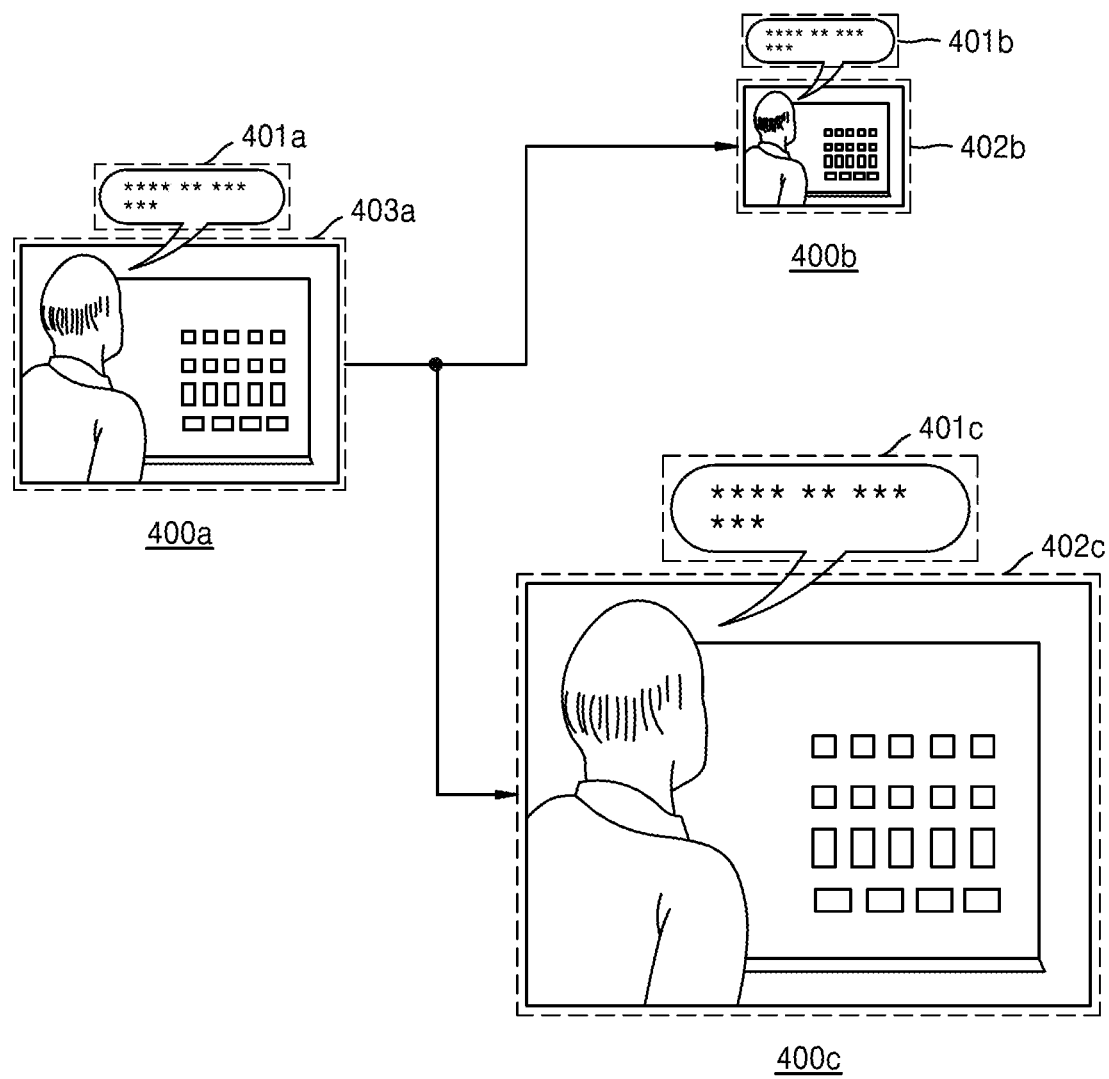
FIG. 13 is a diagram for describing a method of changing a size of each of a plurality of elements, according to an embodiment of the disclosure.

FIG. 13 is a diagram for describing a method of changing the size of each of a plurality of elements, according to an embodiment of the disclosure.

In the above-described embodiment, when the sizes of the plurality of elements included in the image cut layer are changed to the same ratio to change the size of the image cut layer, readability of text may deteriorate.

Thus, the apparatus 100 according to some embodiments of the disclosure may differently adjust numerical values of sizes changed for each element.

When the image cut layer includes the first element including the drawing element and the second element including the text element, the apparatus 100 may change the size of the first element by a first numerical value and the size of the second element by a second numerical value. According to an embodiment, the first numerical value may be greater than the second numerical value. According to another embodiment, the second numerical value may be a numerical value within a range of a threshold value.

For example, when the size of a drawing element 402a included in an image cut layer 400a is reduced by 30%, the size of a text element 401a included in the same image cut layer 400a may be reduced by 5%. Referring to FIG. 13, the size of a drawing element 402b included in an image cut layer 400b, of which the size is reduced by 30% from the initial image cut layer 400a, is reduced by 30% from the initial drawing element 402a, but the size of a text element 401b is reduced by 5% from the initial text element 401a. Also, the size of a drawing element 402c included in an image cut layer 400c, of which the size is increased by 30% from the initial image cut layer 400a, is increased by 30% from the initial drawing element 402a, but the size of a text element 401c is increased by 5% from the initial text element 401a. Accordingly, the apparatus 100 may enhance readability of text included in the second content, regardless of the change in the size of the image cut layer.

One of ordinary skill in the art will understand that the disclosure may be implemented in a modified form without departing from the essential features of the disclosure. Therefore, the methods of the disclosure should be considered in descriptive sense only and not for purposes of limitation. The scope of the disclosure is set forth in the claims rather than the foregoing description, and all differences within the scope equivalent thereto should be construed as being included in the disclosure.

The apparatus 100 described above may be realized by a hardware component, a software component, and/or a combination of a hardware component and a software component. For example, the apparatus 100 and component described in embodiments may be realized by using one or more processing devices, such as a processor, a controller, an arithmetic logic unit (ALU), a digital signal processor, a micro-computer, a field programmable gate array (FPGA), a programmable logic unit (PLU), a micro-processor, or any other device capable of executing and responding to an instruction. A processing device may execute an operating system (OS) and one or more software applications executed on the OS. Also, the processing device may access, store, manipulate, process, and generate data in response to execution of software. For convenience of description, it has been described that one processing device is used, but it would be obvious to one of ordinary skill in the art that the processing device may include a plurality of processing elements and/or a plurality of types of processing elements. For example, the processing device may include a plurality of processors or one processor and one controller. Also, another processing configuration, such as a parallel processor, is possible.

The software may include a computer program, a code, an instruction, or a combination thereof, and may configure the processing device to operate as desired or instruct the processing device independently or collectively. The software and/or data may be embodied, permanently or temporarily, by any type of machine, component, physical device, virtual equipment, computer storage medium or device, or transmitted signal wave, such as to be analyzed by the processing device or provided to the processing device. The software may be distributed on a computer system connected to a network, and stored or executed in a distributed manner. The software and data may be stored in one or more computer-readable recording media.

Methods according to embodiments may be recorded on a computer-readable recording medium by being implemented in the form of program commands executed by using various computers. The computer-readable recording medium may include at least one of program commands, a data file, or a data structure, independently or collectively. The program commands recorded in the computer-readable recording medium may be specially designed for an embodiment. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include machine codes generated by a compiler, and high-level language codes executable by a computer by using an interpreter. The hardware device may be configured to operate as one or more software modules to perform operations of an embodiment, or vice versa.

Embodiments of the disclosure have been described by the limited examples and drawings, but various changes and modifications are possible from the above description by one of ordinary skill in the art. For example, appropriate results may be achieved even when the described techniques are performed in an order different from the described method, and/or components, such as a system, a structure, a device, and a circuit, are combined or associated in a form different from the described method, or replaced by other components or equivalents.

Therefore, other implementations, other embodiments, and equivalents of claims are also within the scope of the claims described below.

The invention claimed is:

1. A method of rearranging webtoon content, the method performed by a processor and comprising:
    obtaining first content in a first format, the first content including a plurality of image cuts having a plurality of elements;
    extracting the plurality of elements included in the first content, wherein the extracting of the plurality of elements comprises extracting a first element including a drawing element included in the first content, and a second element including at least one element other than the drawing element;
    generating a plurality of image cut layers from the plurality of elements by reconstructing the second element based on a distance to the first element; and
    generating second content in a second format by arranging the generated plurality of image cut layers in a designated arrangement, wherein the first format and the second format are different,
    wherein the plurality of elements comprises a plurality of background elements, a plurality of drawing elements, a plurality of speech bubble elements, and a plurality of text elements, and
    wherein the generating of the plurality of image cut layers further comprises generating the plurality of image cut layers respectively corresponding to the plurality of drawing elements, wherein the plurality of background elements, the plurality of speech bubble elements, and the plurality of text elements are included in at least one of the plurality of image cut layers, based on positions of the plurality of drawing elements arranged in the first content.

2. The method of claim 1, wherein the first content comprises the plurality of image cuts arranged in a line, and the second content is generated by two-dimensionally arranging the plurality of image cut layers in the designated arrangement.

3. The method of claim 1, wherein the generating of the second content comprises:
    determining an order of the plurality of image cut layers based on y-axis positions of the plurality of image cuts arranged in the first content; and
    generating the second content by arranging the plurality of image cut layers in the designated arrangement according to the determined order.

4. The method of claim 1, wherein the plurality of elements comprises a first element including a drawing element and a second element other than the drawing element, and
 the generating of the second content comprises:
 determining an order of the plurality of image cut layers based on a position of the first element arranged in the first content; and
 generating the second content by arranging the plurality of image cut layers in the designated arrangement according to the determined order.

5. The method of claim 1, wherein the extracting of the plurality of elements comprises extracting a layer mask element, and
 the generating of the second content comprises matching the extracted layer mask element to the plurality of image cut layers.

6. The method of claim 1, further comprising changing an order of the plurality of image cut layers in response to receiving a user input for at least one image cut layer from among the plurality of image cut layers arranged in the designated arrangement.

7. The method of claim 1, wherein the generating of the second content comprises changing a size of a specific image cut layer, in response to receiving a user input for changing the size of the specific image cut layer.

8. The method of claim 7, wherein the extracting of the plurality of elements comprises extracting a first element including a drawing element and a second element including a text element,
 the plurality of image cut layers comprises at least one first element and at least one second element, and
 the changing of the size of the specific image cut layer comprises changing a size of the first element by a first numerical value and changing a size of the second element by a second numerical value.

9. The method of claim 8, wherein the first numerical value is greater than the second numerical value.

10. The method of claim 8, wherein the second numerical value is less than a threshold value.

11. A non-transitory computer readable recording medium storing a computer program for instructing a processor to execute the method of claim 1.

12. An apparatus for rearranging webtoon content, comprising:
 a memory for storing a computer program; and
 a processor configured to execute the computer program stored in the memory, including,
 obtaining first content in a first format, the first content including a plurality of image cuts having a plurality of elements,
 extracting the plurality of elements included in the first content, wherein the extracting of the plurality of elements comprises extracting a first element including a drawing element included in the first content, and a second element including a least one element other than the drawing element;
 generating a plurality of image cut layers from the plurality of elements by reconstructing the second element based on a distance to the first element,
 and generating second content in a second format by arranging the generated plurality of image cut layers in a designated arrangement, wherein the first format and the second format are different,
 wherein the plurality of elements comprises a plurality of background elements, a plurality of drawing elements, a plurality of speech bubble elements, and a plurality of text elements, and
 wherein the generating of the plurality of image cut layers further comprises generating the plurality of image cut layers respectively corresponding to the plurality of drawing elements, wherein the plurality of background elements, the plurality of speech bubble elements, and the plurality of text elements are included in at least one of the plurality of image cut layers, based on positions of the plurality of drawing elements arranged in the first content.

13. The apparatus of claim 12, wherein the processor is further configured to determine an order of the plurality of image cut layers, based on y-axis positions of the plurality of image cuts arranged in the first content, and
 generate the second content by arranging the plurality of image cut layers in the designated arrangement according to the determined order.

14. The apparatus of claim 12, wherein the plurality of elements comprises a first element including a drawing element and a second element other than the drawing element, and
 the processor is further configured to determine an order of the plurality of image cut layers based on a position of the first element arranged in the first content, and
 generate the second content by arranging the plurality of image cut layers in the designated arrangement according to the determined order.

15. The apparatus of claim 12, wherein the processor is further configured to extract a layer mask element and match the extracted layer mask element to the plurality of image cut layers.

16. The apparatus of claim 12, wherein the processor is further configured to change an order of the plurality of image cut layers in response to receiving a user input for at least one image cut layer from among the plurality of image cut layers arranged in the designated arrangement.

17. The apparatus of claim 12, wherein the processor is further configured to change a size of a specific image cut layer, in response to receiving a user input for changing the size of the specific image cut layer.

* * * * *